United States Patent [19]
McLain, Jr.

[11] Patent Number: 5,812,826
[45] Date of Patent: *Sep. 22, 1998

[54] METHOD AND APPARATUS FOR EMULATING A NETWORK OF STATE MONITORING DEVICES

[75] Inventor: John V. McLain, Jr., Colorado Springs, Colo.

[73] Assignee: MCI Communications Corporation, Washington, D.C.

[ * ] Notice: The term of this patent shall not extend beyond the expiration date of Pat. No. 5,748,617.

[21] Appl. No.: 672,141

[22] Filed: Jun. 27, 1996

[51] Int. Cl.$^6$ .............................. G06F 9/455; G06F 11/30; G06F 15/173
[52] U.S. Cl. ............................................................ 395/500
[58] Field of Search ............................. 395/500, 189.02, 395/700.11; 379/34

[56] References Cited

U.S. PATENT DOCUMENTS

| | | | |
|---|---|---|---|
| 4,455,602 | 6/1984 | Baxter, III et al. | |
| 4,552,297 | 11/1985 | Belanger et al. | 227/120 |
| 4,575,797 | 3/1986 | Gruner et al. | |
| 4,636,948 | 1/1987 | Gdaniec et al. | 364/300 |
| 4,737,985 | 4/1988 | De Luca et al. | 379/327 |
| 4,799,251 | 1/1989 | Smith et al. | 379/1 |
| 4,924,493 | 5/1990 | Dang et al. | 379/94 |
| 5,005,197 | 4/1991 | Parsons et al. | 379/21 |
| 5,008,812 | 4/1991 | Bhandarkar et al. | 364/200 |
| 5,027,343 | 6/1991 | Chan et al. | 370/17 |
| 5,095,505 | 3/1992 | Finucane et al. | 379/201 |
| 5,157,665 | 10/1992 | Fakhraie-Fard et al. | 371/20.1 |
| 5,170,362 | 12/1992 | Greenberg et al. | 364/550 |
| 5,187,740 | 2/1993 | Swaim et al. | 379/209 |
| 5,197,127 | 3/1993 | Waclawsky et al. | 395/200 |
| 5,222,120 | 6/1993 | McLeod et al. | 379/88 |
| 5,224,108 | 6/1993 | McDysan et al. | 370/110 |
| 5,226,041 | 7/1993 | Waclawsky et al. | 370/60 |
| 5,241,584 | 8/1993 | Hardy et al. | 379/67 |
| 5,276,440 | 1/1994 | Jolissaint et al. | 340/825.02 |
| 5,280,481 | 1/1994 | Chang et al. | 370/85.13 |
| 5,285,494 | 2/1994 | Sprecher et al. | 379/59 |
| 5,323,388 | 6/1994 | Chang et al. | 370/60 |
| 5,335,268 | 8/1994 | Kelly, Jr. et al. | 379/112 |
| 5,337,306 | 8/1994 | Hall | 370/13 |
| 5,343,461 | 8/1994 | Barton et al. | 370/13 |
| 5,355,405 | 10/1994 | Bernstein | 379/246 |

(List continued on next page.)

OTHER PUBLICATIONS

Martin et al., *TCP/IP Networking: Architecture. Administration. and Programming,* PTR Prentice Hall, Englewood Cliffs, NJ, 1994, pp. 6–8.

Minoli, *Telecommunications Technology Handbook,* Artech Hous: Norwood, MA, 1991, pp. 101–168.

Peterson et al., *Operating System Concepts. Second Edition,* Addison–Wesley Publishing Company, U.S.A., 1986, pp. 1–15.

Palmer et al., "Restoration in a Partitioned Multi–Bandwidth Cross–Connect Network," IEEE 1990 (pp. 81–85).

Tsukada et al., "The Multi–Project Support System Based On Multiplicity of Task", IEEE, 1994, pp. 358–363.

*Primary Examiner*—Kevin J. Teska
*Assistant Examiner*—Ayni Mohamed

[57] ABSTRACT

A method and apparatus for emulating a change-of-state (COS) report network fully tests a monitor and/or control system (MCS). The communication and behavior of a COS report network are emulated for selected report network configurations, events, and/or COS indications. A communication module communicates with the MCS through emulator links using a communications protocol substantially identical to a communications protocol used in the emulated report network. A configuration database stores configuration data representing the current status of the report network of state monitoring devices. In response to MCS polling, an emulator message generator generates intelligent responses based on the configuration data which emulate communications from a report network of state monitoring devices to the MCS in response to such MCS polling. Simulated multi-tasking and dynamic user-interface control options are included.

32 Claims, 12 Drawing Sheets

U.S. PATENT DOCUMENTS

| | | | |
|---|---|---|---|
| 5,373,501 | 12/1994 | Roland | 370/13 |
| 5,375,126 | 12/1994 | Wallace | 371/20.1 |
| 5,375,159 | 12/1994 | Williams | 379/23 |
| 5,384,822 | 1/1995 | Brown et al. | 379/10 |
| 5,394,540 | 2/1995 | Barrington et al. | 395/500 |
| 5,396,616 | 3/1995 | Venable | 395/500 |
| 5,410,586 | 4/1995 | Davies | 379/14 |
| 5,414,858 | 5/1995 | Hoffman et al. | 395/725 |
| 5,435,003 | 7/1995 | Chng et al. | 395/575 |
| 5,438,528 | 8/1995 | Emerson et al. | 364/580 |
| 5,444,693 | 8/1995 | Arslan et al. | 370/16 |
| 5,475,732 | 12/1995 | Pester, III | 379/34 |
| 5,488,648 | 1/1996 | Womble | 375/13 |
| 5,490,272 | 2/1996 | Mathis et al. | 395/650 |
| 5,513,345 | 4/1996 | Sato et al. | 395/182.02 |
| 5,557,795 | 9/1996 | Venable | 395/650 |
| 5,563,930 | 10/1996 | Pester, III | 379/34 |
| 5,594,792 | 1/1997 | Chouraki et al. | 379/269 |
| 5,600,632 | 2/1997 | Schulman | 370/252 |
| 5,636,345 | 6/1997 | Valdevit | 395/200.45 |

B. REMOTE STATION REPLY TRANSMISSION FORMAT WITH CONTROL REPLY DATA AND COS

DATA BITS:

| Char.# | 1 | 2 | 3 | 4 | 5 | 6 | 7 | |
|---|---|---|---|---|---|---|---|---|
| 1 | Station Code, 1st Part | | | | S | S | M | Remote Station Address Confirmation and COS Indication (*) |
| 2 | Station Code, 2nd Part | | | | M* | S | M | |
| 3 | Station Code, 3rd Part | | | | M | S | M | |
| 4 | 1 | 2 | 3 | 4 | 5 | 6 | S | Alarm Input Point Identification Characters— MARK=Alarm |
| 5 | 7 | 8 | 9 | 10 | 11 | 12 | S | |
| 6-53 | (Alarm Input Points 13 through 300) | | | | | | | |
| 54 | 301 | 302 | 303 | 304 | 305 | 306 | S | |
| 55 | 307 | 308 | 309 | 310 | 311 | 312 | S | Latching Control Relay Supervision Characters MARK=Energized |
| 56 | 1 | 2 | 3 | 4 | 5 | 6 | S | |
| 57 | 7 | 8 | 9 | 10 | 11 | 12 | S | |
| 58-63 | (Control Numbers 13 through 48) | | | | | | | |
| 64 | 49 | 50 | 51 | 52 | 53 | 54 | S | |
| 65 | 55 | 56 | 57 | 58 | 59 | 60 | S | |
| 66 | C11 | C12 | C13 | C14 | S | M | M | Control Reply |
| 67 | R11 | R12 | R13 | R14 | RS1 | RS2 | S | |
| 68 | S | M | M | M | S | M | M | |
| 69 | P11 | P12 | P13 | P14 | S | G12 | M | Telemetry ID Character |
| 70 | G13 | G14 | DV | S | G11 | S | S | |
| 71 | MD1 | MD2 | MD3 | MD4 | 1/2D | MO | S | Telemetry Data— Analog Module #1 |
| 72 | TD1 | TD2 | TD3 | TD4 | PO | S | S | |
| 73 | LD1 | LD2 | LD3 | LD4 | OR | S | S | |
| 74-78 | (Data from Analog module#2, Same Format as Char. 69-73) | | | | | | | |
| 79-83 | (Data from Analog Module#3, Same Format as Char. 69-73) | | | | | | | |
| 84 | M | M | M | M | M | M | DEL | |

```
Physical 5    ON
SID:     1-64      ....+....1....+....2....+....3....+....4....+....5....+....6....
COS Interval ──→   YYYYYYYYYYYYYYYYYYYYYYYYYYYYYYYYYYYYYYYYYYYYYYYYYYYYYYYYYYYYYYYY
Inv Messages ──→   OOOOOOOOOOOOOOOOOOOOOOOOOOOOOOOOOOOOOOOOOOOOOOOOOOOOOOOOOOOOOOOO
                   NNNNNNNNNNNNNNNNNNNNNNNNNNNNNNNNNNNNNNNNNNNNNNNNNNNNNNNNNNNNNNNN Physical 6    ON
SID:     1-64      ....+....1....+....2....+....3....+....4....+....5....+....6....
COS Interval ──→   YYYYYYYYYYYYYYYYYYYYYYYYYYYYYYYYYYYYYYYYYYYYYYYYYYYYYYYYYYYYYYYY
Inv Messages ──→   OOOOOOOOOOOOOOOOOOOOOOOOOOOOOOOOOOOOOOOOOOOOOOOOOOOOOOOOOOOOOOOO
                   NNNNNNNNNNNNNNNNNNNNNNNNNNNNNNNNNNNNNNNNNNNNNNNNNNNNNNNNNNNNNNNN Physical 7    ON
SID:     1-64      ....+....1....+....2....+....3....+....4....+....5....+....6....
COS Interval ──→   YYYYYYYYYYYYYYYYYYYYYYYYYYYYYYYYYYYYYYYYYYYYYYYYYYYYYYYYYYYYYYYY
Inv Messages ──→   OOOOOOOOOOOOOOOOOOOOOOOOOOOOOOOOOOOOOOOOOOOOOOOOOOOOOOOOOOOOOOOO
                   NNNNNNNNNNNNNNNNNNNNNNNNNNNNNNNNNNNNNNNNNNNNNNNNNNNNNNNNNNNNNNNN Physical 8    ON
SID:     1-64      ....+....1....+....2....+....3....+....4....+....5....+....6....
COS Interval ──→   YYYYYYYYYYYYYYYYYYYYYYYYYYYYYYYYYYYYYYYYYYYYYYYYYYYYYYYYYYYYYYYY
Inv Messages ──→   OOOOOOOOOOOOOOOOOOOOOOOOOOOOOOOOOOOOOOOOOOOOOOOOOOOOOOOOOOOOOOOO
                   NNNNNNNNNNNNNNNNNNNNNNNNNNNNNNNNNNNNNNNNNNNNNNNNNNNNNNNNNNNNNNNN

[Script]  [Sta.ID: 1-64,65-128,129-192,193-256]   [Screen: 1  2]   [Save Cfg]  [Exit]
....+....1....+....2....+....3....+....4....+....5....+....6....+....7....+....8
```

FIG. 7B

```
800
┌─────────────────────────────────────────────────────────┐
│  Physical Port: 1         Station ID: 10                │
│    Points        Points         Points        Points    │
│  Mod....+....1.. Mod....+....1.. Mod....+....1.. Mod....+....1.. │
│   1vvvvvvvvvvvv  13vvvvvvvvvvvv  25vvvvvvvvvvvv  37vvvvvvvvvvvv │
│   2vvvvvvvvvvvv  14vvvvvvvvvvvv  26vvvvvvvvvvvv  38vvvvvvvvvvvv │
│   3vvvvvvvvvvvv  15vvvvvvvvvvvv  27vvvvvvvvvvvv  39vvvvvvvvvvvv │
│   4vvvvvvvvvvvv  16vvvvvvvvvvvv  28vvvvvvvvvvvv  40vvvvvvvvvvvv │
│   5vvvvvvvvvvvv  17vvvvvvvvvvvv  29vvvvvvvvvvvv  41vvvvvvvvvvvv │
│   6vvvvvvvvvvvv  18vvvvvvvvvvvv  30vvvvvvvvvvvv  42vvvvvvvvvvvv │
│   7vvvvvvvvvvvv  19vvvvvvvvvvvv  31vvvvvvvvvvvv  43vvvvvvvvvvvv │
│   8vvvvvvvvvvvv  20vvvvvvvvvvvv  32vvvvvvvvvvvv  44vvvvvvvvvvvv │
│   9vvvvvvvvvvvv  21vvvvvvvvvvvv  33vvvvvvvvvvvv  45vvvvvvvvvvvv │
│  10vvvvvvvvvvvv  22vvvvvvvvvvvv  34vvvvvvvvvvvv  46vvvvvvvvvvvv │
│  11vvvvvvvvvvvv  23vvvvvvvvvvvv  35vvvvvvvvvvvv  47vvvvvvvvvvvv │
│  12vvvvvvvvvvvv  24vvvvvvvvvvvv  36vvvvvvvvvvvv  48vvvvvvvvvvvv │
│       |ALL ON|       |ALL OFF|       |EXIT|             │
└─────────────────────────────────────────────────────────┘
               810           820
```

FIG.8

```
900
     ┌──────────────────────────────────────────┐
     │ Physical Port 1 On:    Y [Y/N]           │
     │ ——— GLOBALS ———                          │
     │    Station ID On:      . [Y/N]           │
     │     COS Interval:      . [0/1/2/3/4/5/6/7]│
     │     Invalid Msg's:     . [Y/N]           │
     │    Alarm Modules:     .. [<<,>>;<,>]     │
     │    Alarm Points:...      [<<,>>;<,>]     │
     │         |ACCEPT|    |EXIT|               │
     └──────────────────────────────────────────┘
```

FIG.9

```
Physical Port  1 On:  Y
   Station ID 10 ON:  Y  [Y/N]
       COS Interval:  3  [0/1/2/3/4/5/6/7]
       Invalid Msg's: N  [Y/N]
       Alarm Modules: 6  [<<,>>;<,>]
       Alarm Points:  1  {<<,>>;<,>]

Normal Polls:  .  0
           MI Polls:  .  0

Short Responses:  .  0
     Long Responses:  .  0
  Invalid Responses:  .  0
              [ACCEPT]   [EXIT]
```

```
  1 message  ID Len Sta   MI COS Diag
                  Bytes
       P      4216  4  5   No
       R      4227  4  5       No

EXIT
```

DL10 Emulator Version 1.01a
  End Time:   Mon Nov 02 13:55:04 1996
Start Time:   Mon Nov 02 13:52:31 1996
  Duration    00 Days - 00:02:33

Physical Port: 7

| Sta. ID | COS Int | Inv Msg | Alm Mod | Normal Poll | MI Poll | Short Message | Long Message | Invalid Message |
|---|---|---|---|---|---|---|---|---|
| 1 | 0 | N | 33 | 1 | 2 | 1 | 2 | 0 |
| 2 | 0 | N | 33 | 1 | 2 | 1 | 2 | 0 |
| 3 | 0 | N | 33 | 1 | 2 | 1 | 2 | 0 |
| 4 | 0 | N | 33 | 1 | 2 | 1 | 2 | 0 |
| 5 | 0 | N | 33 | 1 | 2 | 1 | 2 | 0 |

5 Active Logical Devices

Physical Port: 8

| Sta. ID | COS Int | Inv Msg | Alm Mod | Normal Poll | MI Poll | Short Message | Long Message | Invalid Message |
|---|---|---|---|---|---|---|---|---|
| 60 | 0 | N | 33 | 0 | 3 | 0 | 3 | 0 |
| 61 | 0 | N | 33 | 1 | 2 | 1 | 2 | 0 |
| 62 | 0 | N | 33 | 1 | 2 | 1 | 2 | 0 |
| 63 | 0 | N | 33 | 1 | 2 | 1 | 2 | 0 |
| 64 | 0 | N | 33 | 1 | 2 | 1 | 2 | 0 |

5 Active Logical Devices

Physical Port: 9

| Sta. ID | COS Int | Inv Msg | Alm Mod | Normal Poll | MI Poll | Short Message | Long Message | Invalid Message |
|---|---|---|---|---|---|---|---|---|
| 95 | 0 | N | 33 | 0 | 2 | 0 | 2 | 0 |
| 96 | 0 | N | 33 | 0 | 2 | 0 | 2 | 0 |
| 97 | 0 | N | 33 | 0 | 2 | 0 | 2 | 0 |
| 98 | 0 | N | 33 | 0 | 2 | 0 | 2 | 0 |
| 99 | 0 | N | 33 | 0 | 2 | 0 | 2 | 0 |

5 Active Logical Devices

16 Total Active Physical Ports
  15 Total Active Logical Devices

METHOD AND APPARATUS FOR EMULATING A NETWORK OF STATE MONITORING DEVICES

CROSS-REFERENCE TO RELATED APPLICATIONS

This patent application is potentially related to the following commonly owned, co-pending U.S. utility patent applications:

1. "Method and Apparatus for Emulating a Dynamically Configured Digital Cross-Connect Network," Ser. No. 08/641,458, by John V. McLain, Jr., and James Dellinger, filed May 1, 1996, and incorporated herein by reference;
2. "Method and Apparatus for Emulating a Digital Cross-Connect Network," Ser. No. 08/641,459, by John V. McLain, Jr., filed May 1, 1996, and incorporated herein by reference;
3. "Method and Apparatus for Simulating Multi-Tasking," Ser. No. 08/641,460, by John V. McLain, Jr., filed May 1, 1996, and incorporated herein by reference; and
4. "Method and Apparatus for Emulating Digital Cross-Connect Network using a Flexible Topology to Test MCS Network Management," Ser. No. 08/641,461, by John V. McLain, Jr., filed May 1, 1996, and incorporated herein by reference.

BACKGROUND OF THE INVENTION

1. Field of the Invention

The present invention pertains to computer emulation. More specifically, the present invention relates to emulation for purposes of testing communication network monitoring and/or control systems.

2. Related Art

Today's information technology is flooding the telecommunications and other electronics markets with sophisticated products. With an increase in product functionality and reduction in time to market, it is not practical to use traditional component test strategies to test such products. Therefore, it is necessary to simulate the functionality of individual components, components in a group, and the behavior of the components. This includes both positive and negative test scenarios. The approach to utilize actual hardware, software, network prototypes, and communications interfaces is cost prohibitive for complex systems. Even if the environment could be set up, manual interactions to test and certify a product would not be practical.

One such case for testing arises with the implementation of a Monitoring and Control System (MCS) for a network of state monitoring devices. Two examples of such devices are a Datalok 10 (DL 10), manufactured by Pluscom and a Remote Monitoring Unit (RMU-44), manufactured by Analogic. The DL 10 device is illustrative. The DL 10 is a device that monitors the analog or binary state changes of virtually any physical element that generates electronic state data. Such elements that can be monitored by a DL 10 include communications transmission equipment, facility entrance alarms, sensors, temperature gauges, pressure gauges, lighting systems, and any other electrical device sensing a state change of a physical element.

The DL 10 consists of up to 48 latched Change-of-State (COS) alarm modules, each module supporting 12 alarm points, for a total of 576 alarm points per DL 10 device. Each alarm point can be applied to detect a singular state change of a physical element. The DL 10 also consists of several other modules: three latched control supervision modules, six latched control decoder modules, three momentary control decoder modules, three analog multiplexer modules, and one analog prescaler module.

The DL 10 is commonly used in telecommunications networks to monitor the on/off operation of various transmission equipment. For example, an alarm point of a DL 10 may be applied to a digital signal repeater on a fiber optic system to detect if the repeater is working or has failed. The DL 10 will then monitor the operational state of such an element, and will detect binary state changes. Upon such a detection, the DL 10 will trigger an alarm indicating a Change of State (COS). It will include an indication of COS in a response message to the MCS. Each alarm point on a DL 10 that is provisioned (applied to a physical element) will report any COS to the MCS.

In such an application as described above, an MCS sends messages to each DL 10 device to poll for any COS. Each message will have a specific Station Identifier (SID) that identifies the specific DL 10 device it is intended for. While several DL 10 devices that are linked by a single multi-drop circuit may receive a single MCS polling message, only one will match the SID of the message. That one device will then send a response message to the MCS. If no COS is detected in any alarm point on the device, then a short response message indicating such is returned to the MCS. If a COS is detected in any alarm point, then a long response message containing the alarm point status of every provisioned alarm point is sent to the MCS.

The commands and responses between the MCS and the DL 10 devices are transported via control links, which are communications links utilizing Pluscom's proprietary DL 10 protocol. Other communications protocols may be used to support other types of state monitoring devices.

To test the software, hardware, and communications of such an MCS, the behavior of DL 10 devices must be mimicked. To use an actual network of DL 10 devices in a test environment to test the MCS would be impractical; a typical network may consist of hundreds and even thousands of DL 10 devices. To emulate a small sample of the network would not provide the stress and volume needed to fully test the complete range of functionality of the MCS.

To fully test MCS performance, the MCS must be stressed by the behavior of an entire COS report network. As discussed above, a typical report network, such as, a Datalok 10 report network manufactured by Pluscom, can include 16 links to over 4000 state monitoring devices covering over two million alarm points. Given this complexity, to use an actual report network of state monitoring devices in a test environment to fully-test an MCS is impractical and cost-prohibitive.

Prior to the present invention, the behavior of a COS report network has not been fully emulated to test a MCS. Network behavior has not been emulated on any scale to test an MCS, especially in an environment where processing power is limited as in a personal computer system.

What is needed is a computer-implemented method and apparatus for emulating an entire COS report network to allow realistic MCS testing prior to actual implementation. The complete range of functionality of an MCS needs to be stressed. Communication between the MCS and a report network covering millions of alarm points needs to be emulated for different report network configurations, events, and COS indications.

It is further desired that report network behavior be emulated substantially in parallel with the processing of dynamic user-inputs identifying selected network configurations, events, and/or COS indications. It is also desirable that an MCS be fully tested inexpensively using a personal computer which emulates report network behavior and responds to user-friendly inputs identifying selected network configurations, events, and/or COS indications.

SUMMARY OF THE INVENTION

The present invention provides a computer-implemented method and apparatus for emulating a report network to fully test a monitor and/or control system (MCS). An advance in the ability to test an MCS is obtained by emulating the behavior of a report network in reporting detected changes-of-state for a full complement of state monitoring devices. Communication between the MCS and a report network emulator of the present invention is emulated to match actual communication between the MCS and the emulated report network.

Emulator messages are generated in response to MCS polling commands which emulate in content and protocol the message sent from a real report network of state monitoring devices to an MCS. For example, if a report network of DL 10 devices are being emulated, short responses are returned when no change-of-state has been detected in the emulated report network. Long responses are returned to the MCS which identify provisioned alarm points associated with a detected change-of-state.

Invalid messages representing corrupt data sent by individual state monitoring devices and other communication misbehavior can also be emulated in a controlled and repeatable environment. All inbound and outbound communication messages are logged to a communication log file for further analysis. Self-monitoring status and/or error messages are logged to a self-diagnostic file to improve trouble-shooting, error tracing, and isolation of any anomalies during emulation.

Further features of the present invention for emulating a report network of state monitoring devices to test an MCS include simulated multi-tasking and user-interface control options. In particular, the report network emulator switches between servicing MCS inputs and user-inputs to substantially simulate multi-tasking. From the perspective of the user and the MCS, it appears that the emulator services MCS communications and user-inputs in parallel. Emulator control options entered through the user-interface include global and/or local modifications to configuration data entered directly through a user-interface or by executing a selected network event script file.

In this way, different report network configurations and network events are emulated on a personal computer with sub-second response to test an MCS. Emulation according to the present invention is dynamically configurable and scalable. Changes-of-state detected by over 4000 state monitoring devices covering over two million alarm points and the communications protocol used to communicate these detected changes-of-state to the MCS are emulated. Failures in control links and/or individual state monitoring devices, message corruption, network delays, and COS intervals, are emulated for purposes of responding to MCS polling messages. Therefore, the software, hardware, and communications of an MCS can be fully and realistically stressed prior to the MCS being placed in a production environment.

In one embodiment of the present invention for emulating a report network of state monitoring devices to test a MCS, a communication module communicates with the MCS over at least one emulator link using a substantially identical communication protocol as used in the report network. The communication module can further mimic the electrical signal interface protocol used in the report network, thereby, avoiding the need for external modems as found in certain report networks such as a network of DL 10 devices.

A memory unit stores configuration data representative of the behavior of the report network. The configuration data, among other things, identifies the current status of the report network including the status of each emulated state monitoring device and control link. The status of each control link identifies whether the control link is enabled or disabled. The status of each state monitoring device identifies whether each state monitoring device is enabled or disabled, a station identifier, a COS polling interval, whether corrupt data is to be transmitted, and the COS status of each provisioned alarm point in each provisioned alarm module of an emulated state monitoring device.

An intelligence module is provided which includes a simulated multi-tasking controller for switching control transparently between a control-link servicer and a user-interface servicer in a pseudo-parallel fashion which simulates multi-tasking. An emulator processor controls the sending of emulator messages. An emulator message generator generates the emulator messages based on configuration data.

Administrative overhead is greatly reduced, by initializing the configuration data based on pre-set default parameters. In this way, the alarm modules and alarm points are automatically provisioned and global and local parameters are pre-set.

The configuration data is further updated based on modifications entered through user-inputs and/or by executing a user-selected network event script file to override the initial configuration data. For example, a user can input modification to the configuration data directly or can set global station and link parameters and individual station parameters including: a physical port On/Off indicator, a Station ID On/Off indicator, a COS interval, Invalid Messages indicator, a number of provisioned alarm modules in each state monitoring device, and a number of provisioned alarm points in each provisioned alarm module. A group of emulator control displays are provided including a global station and link configuration display, an individual station configuration display, a manual setting of alarm points display, a real-time decoded input/output display, and a network event script listing.

Further features and advantages of the present invention, as well as the structure and operation of various embodiments of the present invention, are described in detail below with reference to the following drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art make and use the invention.

FIG. 6 shows the format of a typical response message generated by the COS Report Network Emulator.

FIGS. 7A and 7B show is a screen display used in an example of the present invention for navigation through a configuration data file.

FIG. 8 is a manual alarm point setting screen display selected from the configuration data file shown in FIGS. 7A and 7B.

FIG. 9 is a screen display for setting global station and link configurations on a multi-drop port.

FIG. 10 is a screen display for setting individual station configurations and displaying station communication statistics.

FIG. 11 is a real-time decoded input/output message display representing de-coded MCS polling and station device response messages.

FIG. 14 is a screen display of an example statistical report generated by the present invention.

Figure 1:
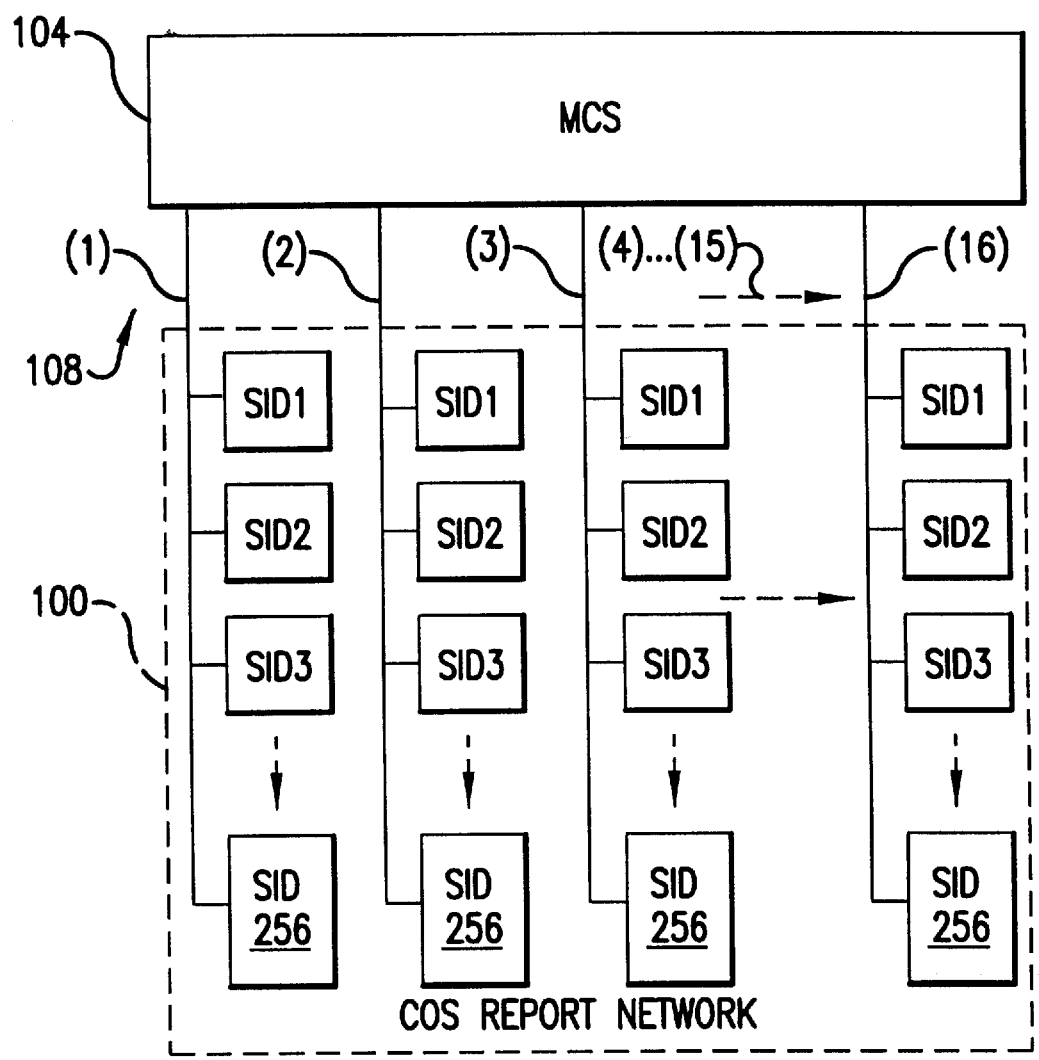
FIG. 1 is a block diagram showing a Change of State (COS) Report Network coupled to a Monitoring and Control System (MCS).

The present invention will now be described with reference to the accompanying drawings. In the drawings, like reference numbers typically indicate identical or functionally similar elements. Additionally, the left-most digit(s) of a reference number typically identifies the drawing in which the reference number first appears.

DETAILED DESCRIPTION OF THE PREFERRED EMBODIMENTS

Table of Contents

Overview
Terminology
Example Environment
COS Report Network
COS Report Network Emulator for Testing a MCS
  Emulator Architecture
  Emulator Operation
  Simulated Multi-Tasking
  Responses to MCS Commands
  User Inputs
    Emulator Control Options
    Modifying Configuration Data
    Setting Alarm Points
    Global Station and Link Configuration
    Individual Station Configuration
    Real-Time Message Display
    Network Event Selection and Execution
    Statistical Report Display
Conclusion

Overview

The present invention provides a computer-implemented method and apparatus for emulating a change-of-state (COS) report network to fully test a network monitoring and control system (MCS). The COS report network being emulated reports change-of-state alarms and status forwarded from a network of thousands of state monitoring devices. Each state monitoring device in turn monitors hundreds of alarm points. In this way, the emulated COS report network covers over two million alarm points.

In the present invention, the behavior, e.g., the communication, between the COS report network and the MCS is emulated in the presence and absence of selected network configurations, events, and/or COS indications. Sub-second responses (solicited and unsolicited) which emulate COS report network behavior for purposes of testing an MCS are obtained.

Terminology

To more clearly delineate the present invention, an effort is made throughout the specification to adhere to the following term definitions as consistently as possible.

The term "change-of-state report network," "COS report network," and equivalents thereof, refer to any network of state monitoring devices. The network can be any configuration or interconnection of state monitoring devices. The COS report network being emulated can support over four thousand network state monitoring devices.

The term "state monitoring device" or "station" refers to any device, system, or network which monitors analog and/or digital (e.g., binary) state changes of virtually any physical element that generates electronic state data. Each monitored physical element is also called an "alarm point". These physical elements that are monitored by a state monitoring device include, but are not limited to, communication transmission equipment, facility entrance alarms, switches, sensors, temperature gauges, pressure gauges, and lighting systems. Each state monitoring device can support hundreds or more alarm points. Each COS report network being emulated then can support over two million alarm points.

The terms "Monitoring and Control System," and equivalents thereof, refer to a centralized system or a remote system feeding to a central system, which communicates with individual state monitoring devices of the COS report network through communication links. In telecommunications applications, for example, the MCS monitors and/or controls network operations, such as repair, real-time network restoration, dynamic line or path configuration, private line service, circuit testing, load balance and traffic flow, based on the output of the COS report network.

The abbreviation "MCS" is used broadly herein to refer to a Monitoring and/or Control System, as defined above, and is not intended to exclude other types of abbreviations found in the industry to refer to network monitoring and/or control systems such as, OSS (Operational System Support) and RTR (Real Time Restoration Software).

Example Environment

The present invention is described in the example environment of a computer which fully tests an MCS product prior to installation by emulating a COS report network. A plurality of state monitoring devices are emulated. Any report network of state monitoring devices by any manufacturer can be emulated according to the present invention. In one example, the present invention emulates state monitoring devices, called "Datalok-10 stations," manufactured by Pluscom. Alternatively, a network of state monitoring devices called "remote monitoring units" or RMU-44 devices, manufactured by Analogic, Inc., can be emulated. The state monitoring devices are applied to communication transmission equipment. Description in these terms is provided for convenience only. It is not intended that the invention be limited to application in this example environment. In fact, after reading the following description, it will become apparent to a person skilled in the relevant art how to implement the invention in alternative environments.

COS Report Network

FIG. 1 shows a block diagram of an example COS report network 100 being emulated according to the present invention. COS report network 100 consists of groups of state monitoring devices. Each group of state monitoring devices is connected to MCS 104 via a respective communication link 108. Sixteen direct physical links 108(1) . . . 108(16) are shown in the example of FIG. 1. More generally, any number of physical and/or logical data communication links can be used. Links 108(1)–108(16) support data communication according to any type of synchronous and/or asynchronous data communication protocol.

As shown in FIG. 1, each cabled link 108(1) . . . 108(16) represents a multi-drop circuit, which maintains parallel connections to a group of 256 state monitoring devices. Each state monitoring device is identified within a group by a Station ID (SID). Messages sent between the MCS 104 and a state monitoring device include an SID. The MCS 104 then reads the SID in a message received over a link to identify a particular originating state monitoring device. Likewise, each state monitoring device on a particular link will receive the same message sent from the MCS 104, but only the intended destination state monitoring device identified by the SID information in the message need respond.

In one example, each state monitoring device represents a single Datalok-10 (DL 10) device manufactured by Pluscom. Each DL 10 supports 576 alarm points. Thus, the present invention can emulate 16×256=4096 DL 10 devices, or 4096×576=2,359,296 alarm points.

Monitoring and Control System (MCS) 104 provides the intelligence to the COS report network 100 via monitoring and control of the state monitoring devices. In practice, a redundant MCS (not shown) is often connected to links 108 as a back-up or watchdog in the event of MCS 104 failure.

COS Report Network Emulator for Testing a MCS

Emulator Architecture

Figure 2:
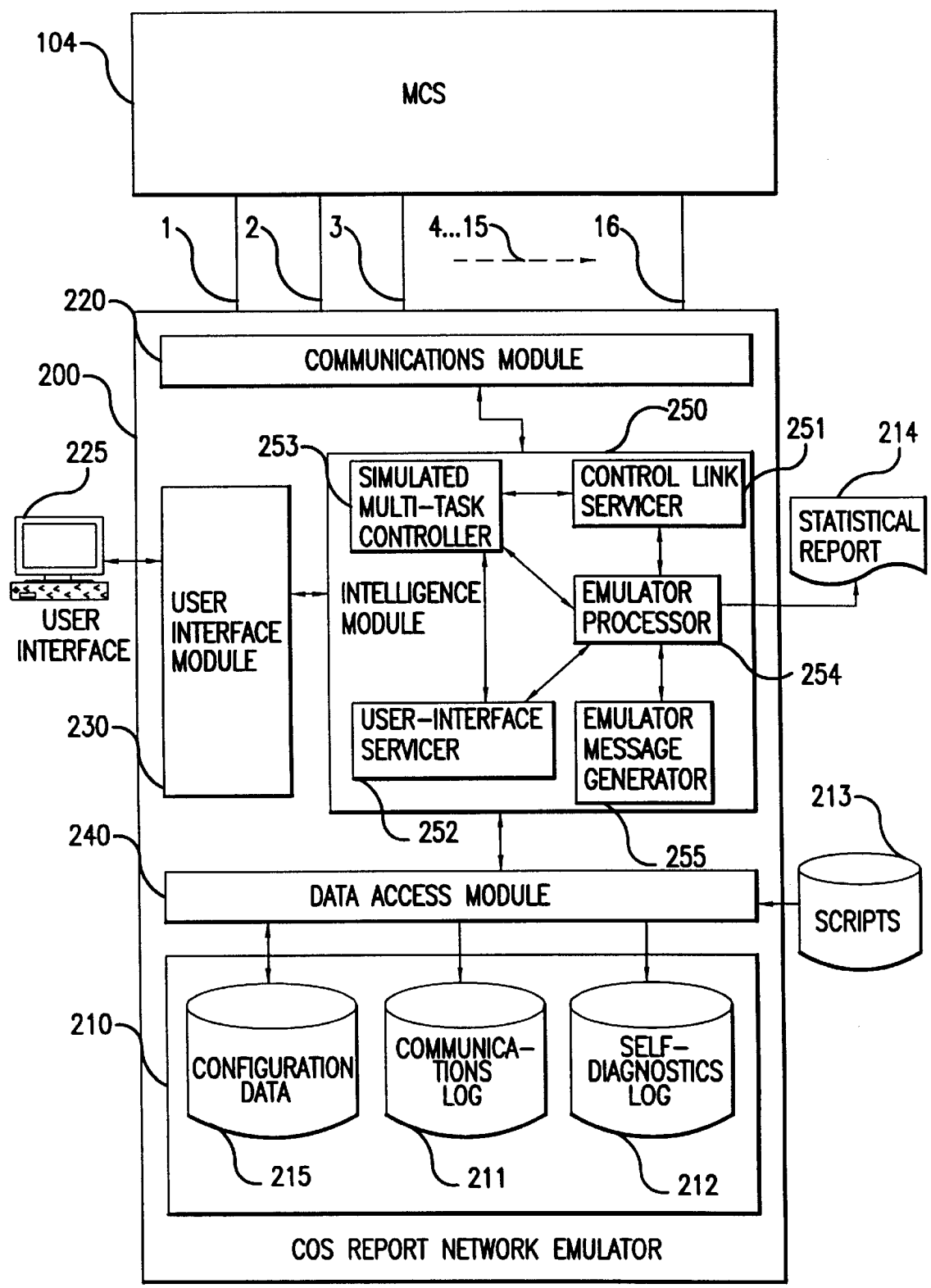
FIG. 2 is a block diagram of a COS Report Network Emulator architecture according to the present invention.

Referring to FIG. 2, a block diagram of a computer system architecture for a COS Report Network Emulator 200 is shown. The Emulator 200 includes four primary modules: Communications Module 220, User-Interface Module 230, Data Access Module 240, and an Intelligence Module 250. Each module 220 to 250 can be implemented as software, firmware, hardware, or any combination thereof.

Communications Module 220 manages communication between the Emulator 200 and the MCS 104. In particular, the Communications Module 220 manages the emulator control links 108(1) to 18(16), monitors incoming MCS messages and outgoing emulator messages, and provides the necessary communications protocol and collision prevention (if any). Data can be transmitted over each of these emulator control links 108 in any standard data communications protocol such as X.25, TCP, IP, Frame-Relay, ATM, SMDS, Ethernet, FDDI, ISDN, SDLC, BISDN, and any other public or proprietary LAN or WAN data link protocol. See, e.g. Martin J. and Leben J., *TCP/IP Networking: Architecture, Administration, and Programming* (Prentice Hall: New Jersey 1994), pages 6–8, incorporated by reference herein. A RS232 Interface with the Datalok 10 protocol and associated multi-drop circuits are used in a preferred embodiment to allow reliable protocol simulation of MCS and emulator messages. The communication module can mimic the electrical signal interface protocol used in the report network, thereby, avoiding the need for external modems as found in certain report networks such as a network of DL 10 devices.

User Interface Module 230 manages a user-interface 225 through which external users can access, navigate and control the Emulator 200. For example, the user-interface 225 can consist of any standard PC I/O component such as a keyboard, mouse, and/or display screen. A graphical user-interface (GUI) can be used. An extended ASCII graphics interface encompassing an extended ASCII character set is preferred to quicken response.

Data Access Module 240 manages data access (input and/or retrieval) to a memory unit 210 and any stored outage scripts 213. In the preferred embodiment shown in FIG. 2, memory unit 210 stores a communication log file 211, a self-diagnostics or "trace" log file 212, and a configuration data file 215. The configuration data file 215 contains configuration data in various data fields representing the behavior of the report network being emulated to test MCS 104. Parameters that are modified during Emulator 200 execution are saved to this file. An example configuration data file 215 and its constituent data fields is described further with respect to screen displays of the configuration data shown in FIGS. 7 and 8.

Custom flat-files are used to store configuration data which allows fast data retrieval by Data Access Module 240 averaging less than one millisecond per data return. Databases and other memory arrangements can be also used. For example, the configuration data 215 can be stored in one or more database files and accessed using a standard database module and database application package. In general, memory unit 210 can consist of cache memory, main memory, magnetic storage, optical storage, disk, tape, and/or any other type of media storage device and memory hierarchy.

An Intelligence Module 250 provides the intelligent processing of the Emulator 200 and interfaces with each of the other three modules 220, 230, and 240. The Intelligence Module 250 is further responsible for generating a statistical report 214 covering the Emulator operation. Intelligence module 250 includes a control link servicer module 251, a user-interface servicer module 252, a simulated multi-task controller module 253, an Emulator processor 254, and an emulator message generator module 255. In a preferred embodiment, each of these modules 220 to 250 represent software applications which can be executed by a personal computer processor.

In general, Emulator 200 can be executed on any computer system. A stand-alone personal computer (PC) system is preferred, however, as such platforms are relatively inexpensive and widely available. In particular, the Emulator 200 can be run on an IBM-compatible PC with an Intel-286, 8-MHZ processor, 640 kB RAM, 30 MB Hard-disk drive, a DOS Operating system, a Super VGA monitor, and a Microsoft compatible mouse with a 7.04 driver. A 16 communications port card was used to support links 108(1)–108 (16). As would be apparent to one skilled in the art, these PC hardware requirements are illustrative. Macintosh-compatible PCS, faster processors, increased memory arrangements, and higher resolution displays can be used to improve performance. Likewise, inexpensive slower processors and hardware can be used.

For clarity, only one Emulator 200 is coupled to one MCS 104. The present invention can be applied in alternative arrangements involving multiple Emulators and multiple MCS systems. Indeed, an Emulator can feed more than one MCS. Multiple Emulators can feed one MCS.

The operation of each of these Emulator modules 220 to 250 to emulate a COS report network to test a MCS in the presence and absence of network failure (e.g. changes in the state of monitored physical element(s)) is now described further with reference to FIGS. 3 to 14.

Emulator Operation

Figure 3:
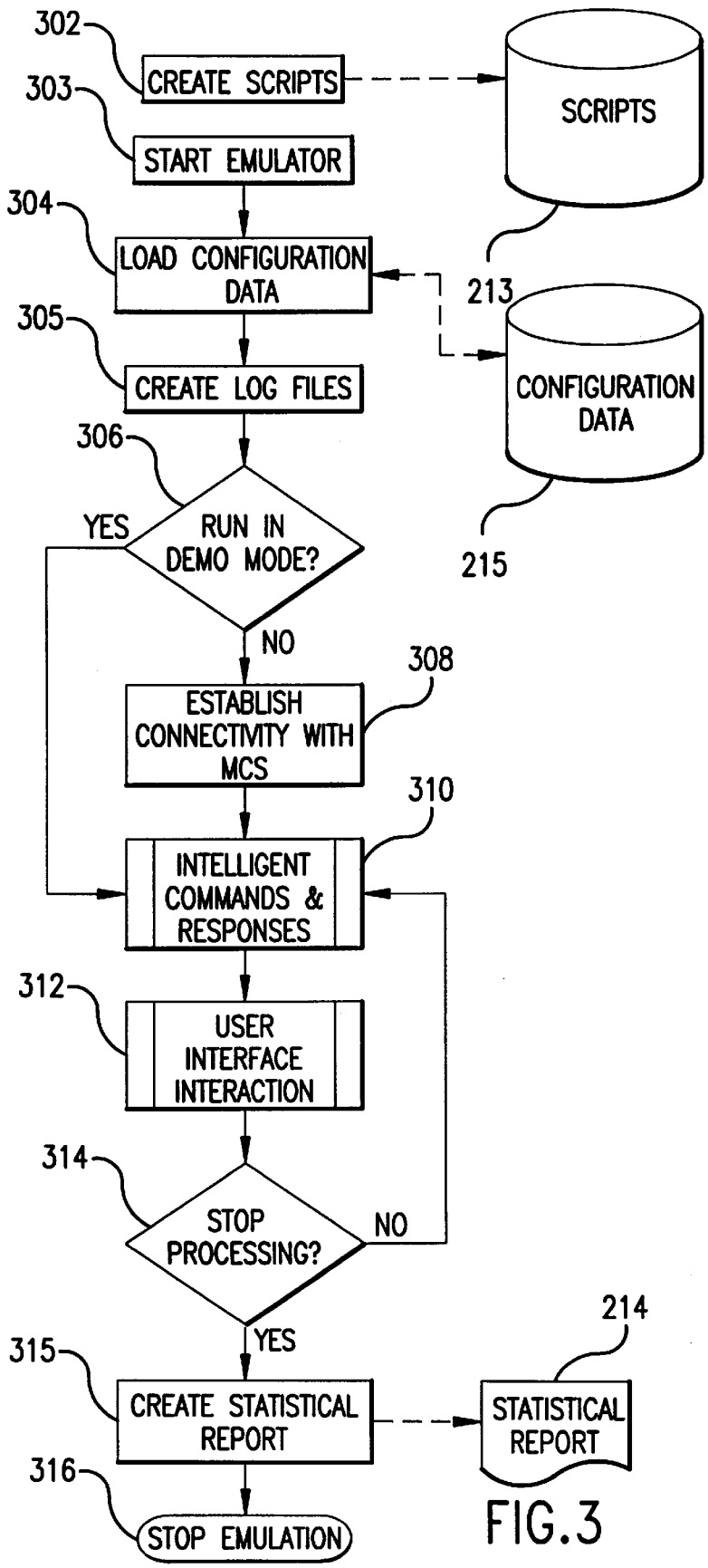
FIG. 3 is a flowchart illustrating overall COS Report Network Emulator operation according to the present invention.

FIG. 3 shows a flowchart of the overall end-to-end operation of the Emulator 200. This overall operation, as described herein, is run under the general control of the Intelligence Module 250, and in particular Emulator processor 254.

In step 302, Emulator processor 254 (or any other computer system) creates pre-stored network event scripts 213. While an off-line operation is preferred in this example, on-line creation of network event scripts 213 can also be performed in response to user-inputs through the MCS 104 and/or user-interface 225.

Figure 7A:
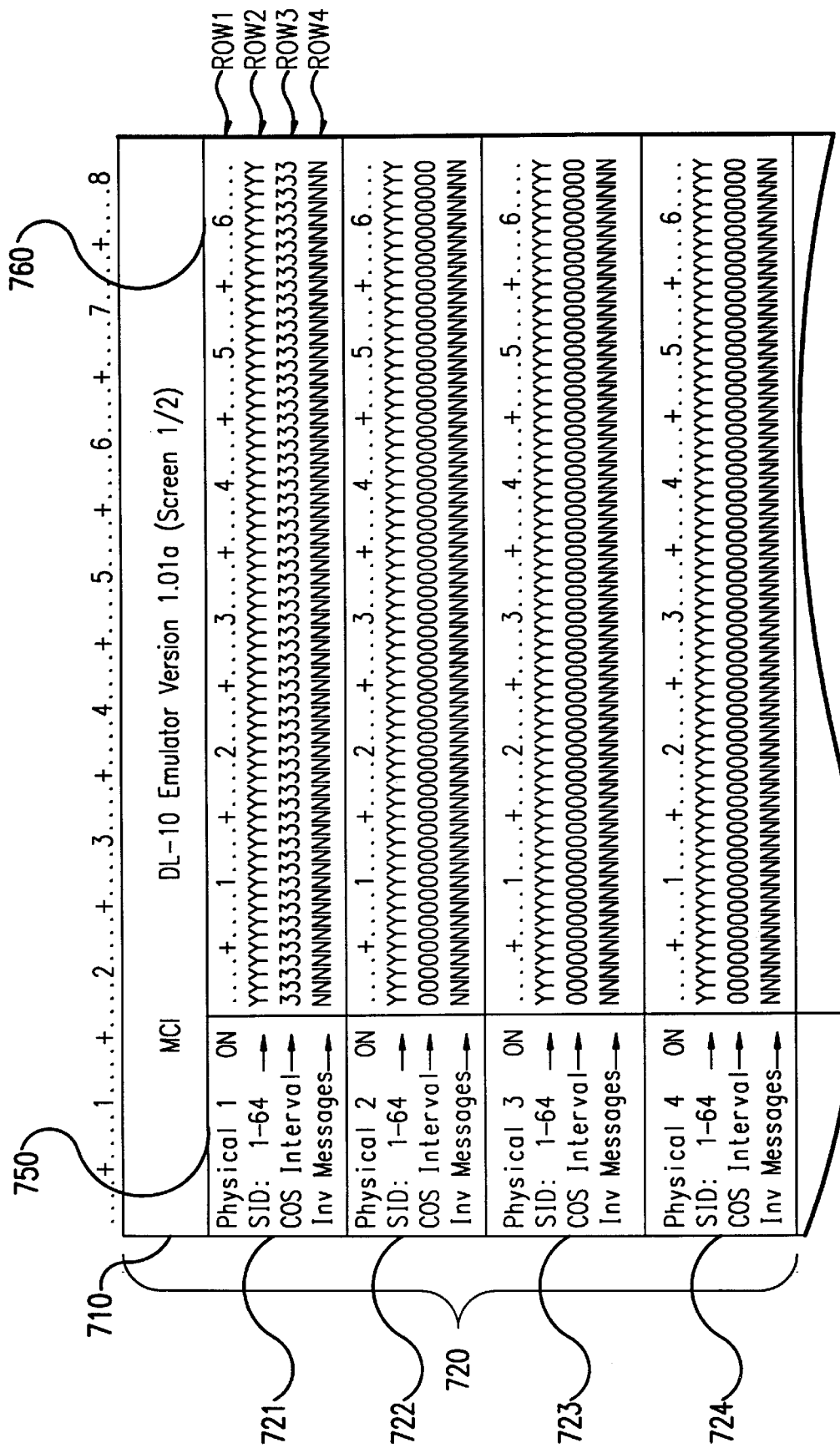

In step 303, the emulator operation begins. First, a configuration data file 215 is loaded, if necessary into memory unit 210 (step 304). Various flat-file access routines parse and process initial data from a main external database into corresponding data fields to form configuration data file 215. Alternatively, configuration data file 215 can be loaded directly into the Emulator memory unit 210. At the beginning of a session, the user can be presented with a display of the main configuration data file 215 as shown in FIGS. 7A and 7B. If a configuration data file is not found, Emulator will create a default configuration file based on pre-defined default parameters. In this way, alarm modules and alarm points are automatically provisioned and global and local parameters are pre-set.

In step 305, two session log files (communication log 211 and self-diagnostics log 212) are also created. The communications log file 211 records all messages received and sent by the Emulator. The self-diagnostics log file 212 records all error messages and transaction return codes created during Emulator 200 execution.

Next, the Emulator 200 offers the option to run in Demo Mode (step 306). If the user opts to run the Emulator in Demo Mode, the Emulator processor 254 proceeds to step 310. In Demo Mode, the Emulator has no connectivity to the MCS 104. In one example, the Emulator 200 operates using data from the configuration data files and from user input as described below, but it does not receive or respond to commands from the MCS 104. In another example, predetermined MCS-type message traffic can be generated and sent to the Communication module 220 for demonstration or training purposes.

If a Demo Mode is not selected, the Emulator 200 establishes connectivity with the MCS 104 (step 308). Status messages can be sent back and forth between the MCS 104 and the communication module 220 to confirm the establishment of connectivity. Once connectivity is verified by the Emulator processor 254 and/or Communications Module 220, the Emulator can receive and respond to commands from the MCS 104 (step 310).

In step 310, the Emulator 200 receives commands, such as, polling messages, from the MCS 104. MCS commands are communicated through communication module 220 to the Intelligence Module 250. MCS commands are detected and processed by Emulator processor 254 when the control-links are serviced by control link servicer 251. Emulator processor 254 works with Emulator message generator 255 to send intelligent solicited and unsolicited responses back to the MCS 104 which emulate actual responses (or lack thereof) over control links 108 in the COS report network 100 being emulated.

In step 312, the Emulator 200 allows for user interaction to perform tasks such as modifying the configuration data 215. When user-interface servicer 253 services the user-interface 225, user inputs for navigation and control of the Emulator 200 are communicated through user-interface module 230 to the Emulator processor 254 of Intelligence Module 250. Both of these steps 310 and 312 in the operation of Emulator 200, are described farther below with respect to a specific user-interface example.

Finally, when the user opts to terminate processing (step 314), a statistical report 214 is generated (step 315) and operation of the Emulator 200 stops (step 316). In general, the Emulator 200 can be run 7 days a week, 24 hours a day to allow extensive MCS testing and evaluation.

Simulated Multi-Tasking

According to a further feature of the present invention, steps 310 and 312 are carried out in a pseudo-parallel fashion to simulate multi-tasking. In general, control is passed between tasks supporting step 310 and step 312 to optimize overall application execution time. The switching between tasks in steps 310 and 312 is performed sufficiently quickly as to be transparent to the user and the MCS 104. This emulates the precise behavior of an actual COS report network by allowing the communications between the Emulator 200 and the MCS 104 to occur while simulated network events are triggered by user-inputs. Simulated multi-tasking further enables the Emulator 200 to be run on a personal computer and to accurately emulate the behavior of an entire network of state monitoring devices covering millions of alarm points by providing sub-second responses to a MCS under test.

Sub-second response, as used herein, means messages can be formulated by the Emulator 200 in milliseconds, i.e., typically less than one millisecond. The emulator messages further arrive at the MCS in less a second, and usually within milliseconds, i.e. approximately 10–100 milliseconds, depending upon communication transit delays. Sub-second response for the user-interface, as used herein, means the Emulator 200 responds to a user-input in less than a second and typically within milliseconds, i.e. 10–250 milliseconds.

The simulated multi-task controller 253 switches control between the control-link servicer 251 and the user-interface servicer 252 according to a simulated multi-tasking routine. This routine consists of four logical procedures: (1) Service control links, (2) Check user interface, (3) If user input detected, service user interface, and (4) Switch from servicing the user-interface to service control links but return to servicing the user-interface such that the switch to servicing control links is substantially imperceptible or at least not inconvenient to the user.

In a preferred embodiment, this simulated multi-tasking routine is programmed into respective program modules in the control-link servicer 251 and the user-interface server 252. See, the inventor's commonly-assigned, co-pending U.S. utility patent "Method and Apparatus for Simulating Multi-Tasking," Ser. No. 08/641,460, by John V. McLain, Jr., incorporated herein by reference above.

In particular, to execute step 310, simulated multi-task controller 253 switches control to control link servicer 251 to service control links 108. During this time, Emulator processor 254 detects and responds to any incoming messages from the MCS 104. Periodically, after completion of a partial logic work unit or a complete logic work unit (i.e. within milliseconds and even nanoseconds), the simulated multi-task controller 253 checks to determine whether a user-input has been received (i.e. stored in a buffer). If a user-input has been received, the simulated multi-tasking controller switches control to user-interface servicer 252 to service user-input(s), that is, begin executing a corresponding user-interface program module.

Only one partial logical unit of work is executed at a time to service the user-input. After each partial logical unit of work is performed in the user-interface code, controller 253 returns to servicing MCS control links. In this way, the MCS 104 does not perceive the Emulator 200 to be unresponsive. A partial logic unit of work is then completed in the servicing of the MCS links before control switches back to complete execution of another user-interface code partial logic unit of work. In this way, the user does not perceive a delay by the Emulator in processing user-inputs.

For example, consider a user request that a certain screen be displayed i.e. configuration data file 215. During the painting of that screen, the simulated multi-tasking routine is executed. Simulated multi-task controller 253 transfers control from the painting of the screen after a partial logic of unit of work has been done by the user-interface servicer 252 toward servicing user-inputs. For example, after half of the screen pixel data is displayed, the simulated multi-task controller 253 switches control back to the control-link servicer 251 to service the control links. Control returns quickly to the user-interface servicer 252 to complete the painting of the screen.

The simulated multi-task controller 253 switches between tasks in such a short time interval, i.e. less than a millisecond, that external user(s) do not notice the interruption, and therefore perceive multi-tasking. In fact, this routine is performed faster than the native operation of either a single- or multi-tasking operating system (OS). Note the simulated multi-tasking routine may be run on either a single-tasking OS or a multi-tasking OS.

In sum, simulated multi-tasking is executed frequently throughout the operation of the Emulator 200, and is performed with sufficient speed (subsecond response) as to be transparent to the user and to the MCS 104. Thus, to the user it appears as if the Emulator 200 is dedicated to the tasks required in responding to the user input. To the MCS 104 it appears as if the Emulator 200 while running an application is dedicated to continuously servicing bi-directional communication over the emulator control links 108 and servicing inputs and outputs to the user-interface 225. This gives the appearance of multi-tasking in carrying out steps 310 and 312.

Responses to MCS Commands

Figure 4:
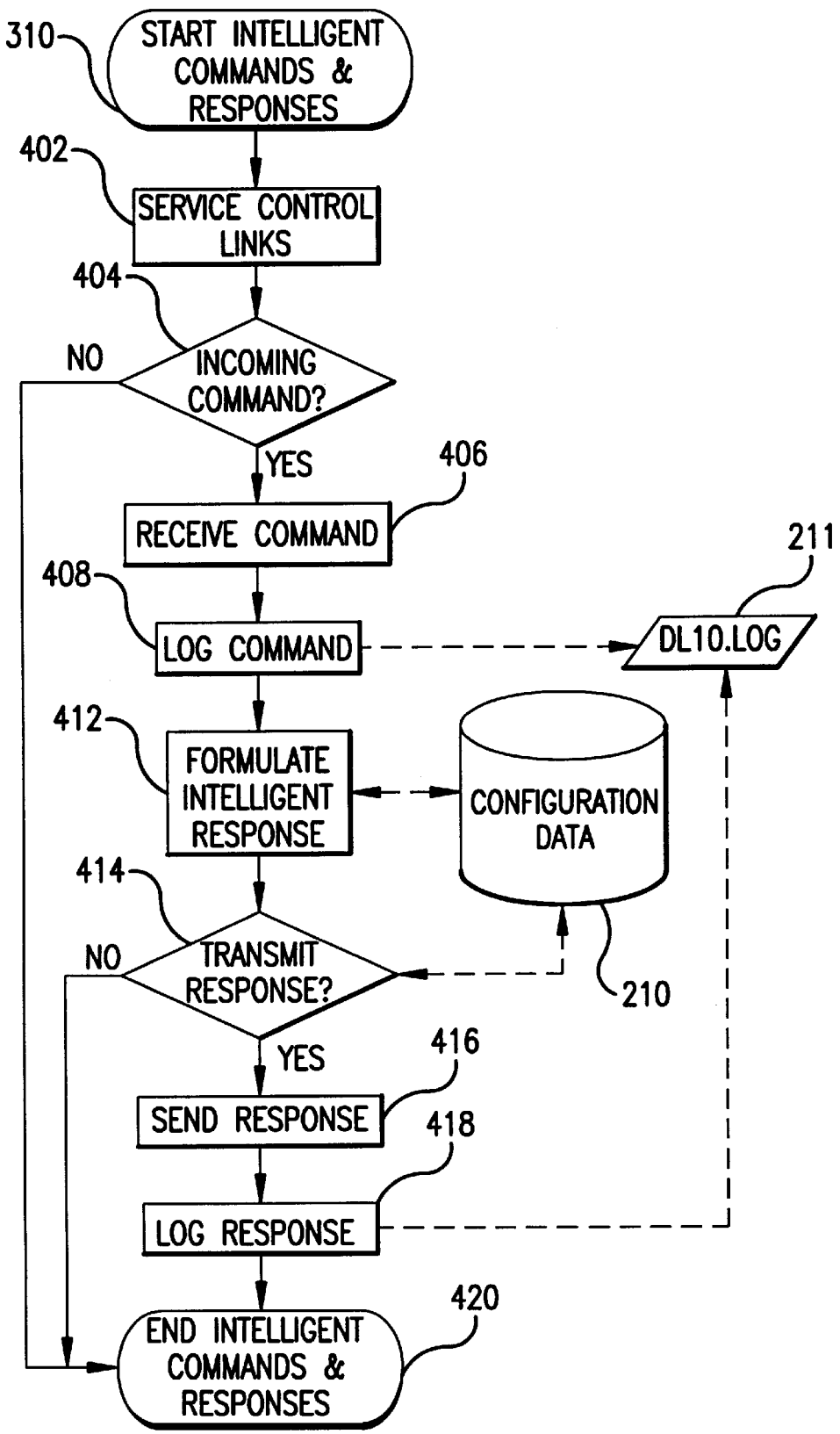
FIG. 4 is a flowchart illustrating in more detail the operation of the Intelligent Commands and Responses routine in step 310 of FIG. 3.

FIG. 4 provides a detailed breakdown of the Intelligent Commands and Responses sub-process (step 310). In step 402, the Emulator 200 services all emulator links 108. To emulate an actual COS report network 100, this servicing of control links 108 must be performed nearly continuously. For example, to emulate a typical network of DL 10 state monitoring devices in a long-distance communication environment can involve thousands of change of state alarm modules and over two million physical elements representing alarm points. Each alarm point must be checked in a manner that the user perceives to be simultaneous to other tasks that the Emulator 200 must perform, such as responding to user inputs and providing screen displays. To accomplish this on a standard PC running with either a multi-tasking or a single-tasking operating system, a simulated multi-tasking routine is conducted as described above.

In step 404, the Emulator processor 254 determines if any incoming commands from the MCS 104 have been found, i.e. placed in a buffer managed by the Communication module 220 for receiving data from a respective link 108. Such MCS commands are usually polling messages requesting status messages from the state monitoring devices, i.e., the DL 10 devices. Manual Interrogatories (MI) are issued by the MCS when an immediate emulator response indicating alarm status (i.e., a long response) is needed. The MCS commands can also include confirmation messages for confirming connectivity and/or status and any other type of data communication message.

These MCS commands can be sent on a "global" basis over all links 108 to all state monitoring devices or to a group of state monitoring devices connected to a common link. MCS commands can also be sent on an "individual" basis to a single linked state monitoring device. MCS commands are issued automatically, periodically, or manually on demand. If there are no incoming commands from the MCS 104, then this sub-process ends with step 420 and returns to the main process depicted in FIG. 3 (step 312).

If any incoming MCS commands are present, then the Emulator processor 254 detects and receives the MCS command (step 406). In step 408, the Emulator processor 254 acts through the Data Access module 240 to store the received MCS command in communications log file 211 of memory unit 210. Every command received from the MCS 104 and every Emulator response sent to the MCS 104 is logged chronologically. The communication log file 211 is designed to wrap around itself at the end-of-file mark, so it never needs to be reset. This enables the Emulator 200 to be run continuously on a 7-day×24-hour/day basis, without ever having to be shut down or restarted.

In step 412, Emulator 200 formulates an intelligent response to the MCS command which emulates the response or lack of response of the COS report network 100 to the incoming MCS command. In responding to MCS commands, Emulator 200 emulates both: (1) the content of messages sent from the emulated COS report network 100 reporting on the status of state monitoring devices; and (2) the enabling or disabling of entire control links 108, i.e., a "global" communication failure.

The Emulator processor 254 formulates an intelligent response by reading the Station Identifier (SID) specified in the MCS command. The SID identifies a destination state monitoring device (e.g., a DL 10 device). The Emulator processor 254 queries about the status of the specified destination DL 10 SID state monitoring device. The configuration data file 215 is read to determine if any alarm point on the DL 10 SID has changed.

In response to normal MCS polling, Emulator message generator 255 then generates a "short response" or a "long response" depending upon the COS status of the destination SID. If no change of state has occurred for any alarm point, the Emulator message generator 255 formulates a short response, which simply indicates no change-of-state (COS) has been detected. If the Emulator processor 254 has detected a COS in any alarm point on the specified DL 10 SID, then Emulator message generator 255 formulates a "long response", which contains the alarm point status of every provisioned alarm point covered by the specified DL 10 state network monitoring device. In accordance with the actual response of a real DL 10 device, non-provisioned alarm points need not be reported. As mentioned above, Emulator message generator 255 generates an immediate "long response" when a Manual Interrogatory is received.

FIG. 6 shows the structure of a typical valid DL 10 response message 600. The response message 600 is arranged in 7-bit segments called characters. Eighty-four characters (#1–#84) are used in a long response message as shown. The first characters (#1–#3) are reserved for providing remote station code, address confirmation, and COS indication information. Characters (#4–#55) represent COS indicators for alarm points. In a short response, this data is omitted. Characters #55–#84 allow further control and monitoring of the state monitoring device including latching control relay supervision, control reply, telemetry data for three analog modules, and a delete DEL character identifying the end of the message.

The above message format described with respect to FIG. 6 is typical of a Pluscom DL 10 device. The present invention, however, is not limited to a DL 10 state monitoring device and a DL 10 message format. Any other state network monitoring type of device and appropriate message format (e.g., type, data, size, protocol, and manufacturer) can be used.

The Emulator 200 is also capable of formulating and responding with invalid messages to further test the response of the MCS 104. This corrupt message capability is set for each state monitoring device in the configuration data file 215. In particular, an Invalid Messages indicator is tracked and maintained in the configuration data file 215 for emulating corrupted messages. For example, if the Invalid Messages indicator is set to Yes "Y" for a DL 10 SID, the Emulator message generator 255 will invert bits in a short or long response message for that DL 10 SID to produce a message not properly recognized by the MCS 104. This emulates data corruption. The content of the configuration data file 215 will be described further below with respect to FIGS. 7A and 7B.

After formulating its intelligent response in step 412, the Emulator processor 254 determines if this emulator message, e.g., a short or long response, is to be transmitted to the MCS 104 (step 414). The configuration data file 215 is queried to determine if the physical link, also called a port, that supports the queried DL 10 SID is enabled. Specifically, a physical port ON/OFF indicator in the configuration data file 215 is checked to see whether the indicator is ON, thereby, indicating a transmissive port or link. When the link 108 is emulating a transmissive link, the Emulator processor 254 sends the emulator message response generated by emulator message generator 255 over the transmissive link 108 to the MCS 104 (step 416). Alternatively, when the emulator processor 254 has determined the physical port is disabled and its emulator message response should not be transmitted, the step 310 sub-process ends (step 420) and returns to the main process depicted in FIG. 3 (step 312).

In step 418, the emulator message response sent by the Emulator 200 is logged in the communication log 211. After the emulator message response is logged, the step 310 sub-process ends (step 420) and returns to the main process depicted in FIG. 3 (step 312).

As described above, by returning to step 312, the Emulator allows for user interaction to perform such tasks as modify the configuration data in the Emulator and/or execute a script that can simulate a network event to further test MCS response. Throughout execution of step 312 for responding to user-inputs, the Emulator 200 frequently services the control links 108(1) ... 108(16), depicted as step 402 in FIG. 4. This is performed with no perceived interruption to execution of step 312, via the simulated multi-tasking routine incorporated by reference above. In this way, a COS report network covering multitudes of actual state monitoring devices, which continuously respond to MCS 104 commands, is properly and effectively emulated on a personal computer even during periods of user interaction and control.

User Inputs
Emulator Control Options

Figure 5:
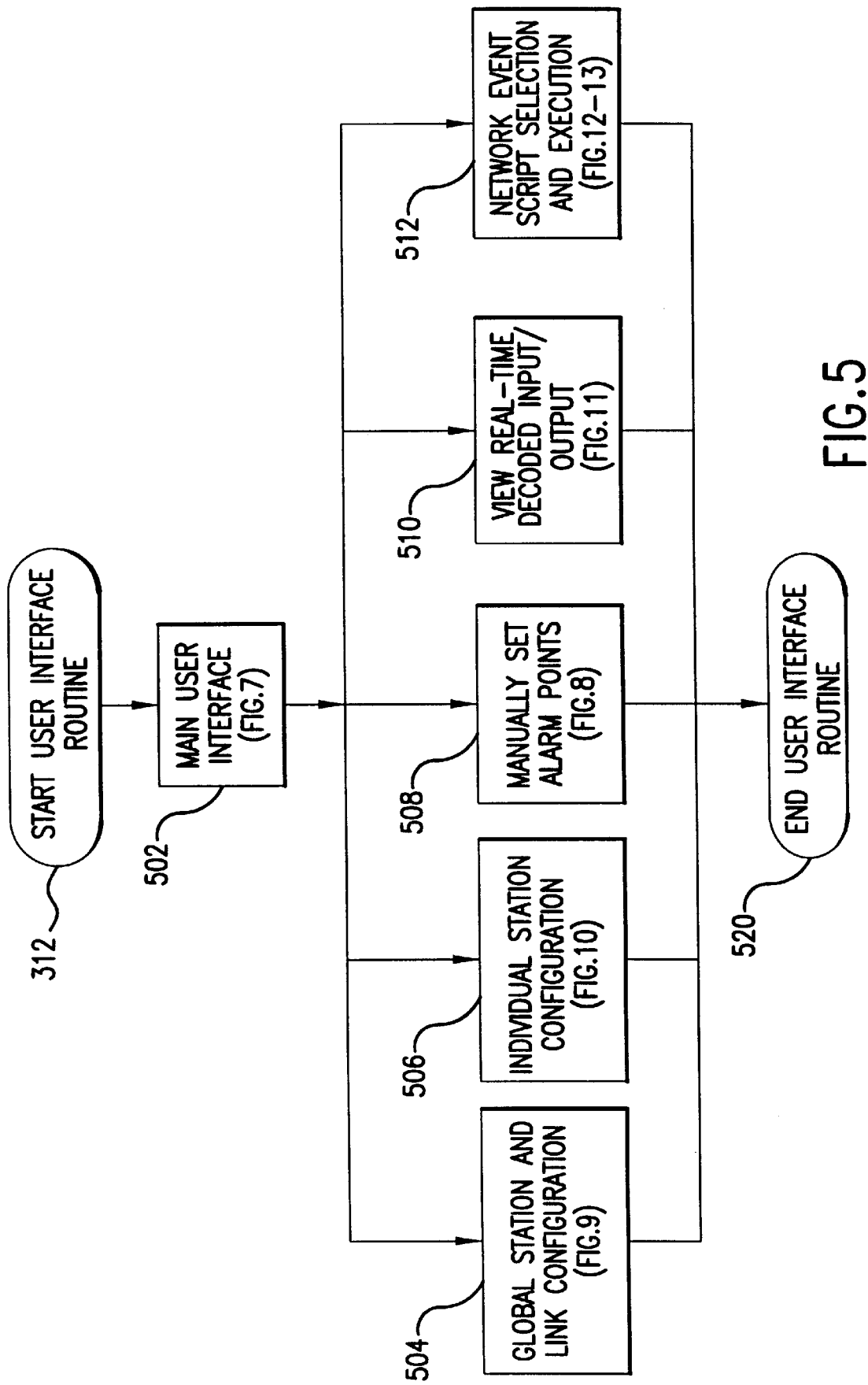
FIG. 5 is a flowchart illustrating in more detail the operation of the User-Interface routine in step 312 of FIG. 3.

The User Interface Interaction sub-process 312 is shown in greater detail in FIG. 5. In step 502, the user interface module 230 presents to the user-interface 225 a Main User Interface display 700 which includes a title bar 710, a display portion 720 of the contents of Configuration Data file 210, and a button bar 740, as illustrated in FIGS. 7A and 7B. Scroll bars, drop-down menus, and other customary graphical-user interface (GUI) features can be displayed as well.

Through the user interface 225, user inputs can be provided for modifying global station and link configuration (step 504). This includes modifying configuration data for any state monitoring device and communications link to the MCS 104. Such global configuration changes are especially useful for testing an MCS as macro changes can be made to the configuration data of an emulated COS report network. This saves great effort when emulating a DL 10 report network that covers 4096 devices and over 2 million alarm points.

User inputs for individual station configuration can be made to configure individual devices (step 506) and to manually set alarm points (step 508). Further, Emulator control options allow a real-time decoded display of input and output MCS commands and messages to be viewed (step 510) and a network event script to be selected and executed (step 512). When user inputs are no longer received, the end user interface sub-process ends (step 520) and returns to step 314 for further processing, if necessary. Each of these user input steps 502 to 512 is described in further detail with respect to the screen displays shown in FIGS. 7 to 13.

Modifying Configuration Data

Referring to FIGS. 7A and 7B, the current status of the emulated COS report network 100, including the status of each emulated state monitoring device, is maintained in the configuration data file 215 and shown in the display window portion 720. The horizontal display sections 721 to 728 correspond to respective communications link 108(1) ... 108(8) and are labeled as Physical 1 to Physical 8 as shown. Only physical ports/links 1 to 8 are shown in FIGS. 7A and 7B. Physical ports/links 9 to 16 would be shown in an identical manner on a second page accessible by scrolling or jumping to the next page by clicking button 799.

Each horizontal display section includes a header column portion 750 and COS data portion 760. The header column portion 750 includes the Physical port identifier (e.g. Physical 1 to Physical 16) and an ON/OFF indicator. SID range, COS Interval, and Inv. Message labels in the header column 750 point to corresponding SID range, COS Interval, and Inv. Message data in the COS data portion 760.

The ON/OFF indicator following the Physical port identifier specifies if that port is enabled (ON) or disabled (OFF). This allows the Emulator 200 to emulate a global communications failure as described earlier. If set to OFF, commands from the MCS 104 will still be accepted and logged by the Emulator, but responses from the specific Emulator port will not be sent over the corresponding link 108(1)–108(16).

To the right of each horizontal section's header column 750 are 256 single-space columns in the data column 760 that represent each of the 256 state monitoring devices, i.e., DL 10 stations, served by that particular Physical port. The screen print in FIG. 7 shows 64 such columns; the remaining 192 columns are accessible by scrolling right by making a selection at button 798.

The four rows (Row 1 to Row 4) that make up a single horizontal section 721–728 are defined as follows in Table 1:

| Row | Function |
| --- | --- |
| Row 1 | Indicates the physical port number and an ON/OFF status of that port. The 256 columns to the right of the ON/OFF indicator represent the SID of each of the 256 DL 10 devices served by the physical port. |
| Row 2 | SID (Y)es/(N)o indicator for each DL 10 SID that indicates if that particular DL 10 is enabled (Y) or disabled (N). This allows the Emulator to emulate a single device failure. In the header column, the range of SIDs (i.e., "SID: 1–64") displayed on the current screen is indicated. |
| Row 3 | Change of State (COS) Interval for each DL 10 SID specifies the number of polls from the MCS 104 between which a change of state will register for that SID. A value of "0" indicates no COS will occur. A value of "1" indicates a COS will occur with every poll. A value of "7" indicates a COS will occur with every 7th poll. This function allows the user to program in the frequency of state changes that will be detected by each emulated DL 10. |
| Row 4 | Invalid Messages (Y)es/(N)o indicator for each DL 10 SID specifies if the particular SID will transmit invalid response messages to the MCS 104. This allows the Emulator to emulate message data corruption, such as that caused by excessive noise on a transmission line or faulty logic in a DL 10. |

While the configuration data file 215 shown in FIGS. 7A and 7B is available and populated at startup of the Emulator (step 304), the data may be modified by the user through graphical-user-interface inputs throughout Emulator operation.

Each DL 10 SID represented in columns 1–64 in FIGS. 7A and 7B (columns 65–256 may be accessed by scrolling right) contains up to 576 individual alarm points, each of which may be monitored for change of state detections. By selecting a specific SID in FIGS. 7A and 7B (i.e., mouse point-and-click), the individual alarm points can be displayed in a separate display window 800 as shown in FIG. 8.

Setting Alarm Points

In the manual setting of alarm points display 800, the individual alarm points of a specific DL 10 SID state monitoring device are displayed. This display window 800 is shown separately in FIG. 8 for clarity; however, it can be overlaid on the configuration file display 700 as is common in GUI display applications.

The Physical Port and SID data are identified on the top row; in this example, the Physical Port is "1" and the SID is "10." Below the top row, is a grid containing a COS indicator for each provisioned alarm point. While an individual DL 10 SID can contain up to 576 alarm points, only those alarm points that are provisioned will have a COS indicator. "Provisioned" means the alarm point is applied to detect a state change of a physical element. The provisioning of alarm points in the Emulator 200 is configurable during pre-processing or during emulator operation through user inputs to the alarm points display window 800. Individual user inputs can manually select to change an alarm point setting, for example, by pointing and clicking a specific alarm point. "All On" and "All Off" buttons 810, 820 are provided for globally turning all of the COS indicators on or off respectively.

The grid is arranged in modular sections (Mod), corresponding to the forty-eight actual hardware modules of a real DL 10 device. The modules are identified by numbers 1–48. Immediately following each module number are twelve characters (COS indicators) representing the twelve alarm points supported by each module. A "v" character indicates no alarm will be transmitted for that alarm point. A "^" character indicates an alarm will be transmitted for that alarm point (see Module 2, alarm point 5). As mentioned above, this data may be modified by the user throughout Emulator operation (see, step 508).

Global Station and Link Configuration

In step 504, the user is provided the capability to globally configure any Station I.D. (SID) or control link. By selecting a certain "Physical" port number from the configuration screen 700, a corresponding global physical port display 900 having global parameters is presented as shown in FIG. 9. This display window 900 is shown separately in FIG. 9 for clarity; however, it can be overlaid on the configuration file display 700 as is common in GUI display applications.

Through the global physical port display 900, the user can globally configure the selected physical port and all DL 10 SIDs supported by it (step 504). Referring to FIG. 9, the user can perform the following global configuration functions in step 504 by varying the global parameters in display 900 as shown and described in the following Table 2:

| Global parameter | Function |
| --- | --- |
| Physical Port X On/Off (X is a variable, e.g., 1 to 16) | Enable or disable the entire port X and, therefore, all supported SIDs. |
| Station ID On/Off | Enable or disable all SIDs supported by the port. If disabled, the Emulator will still receive MCS messages for these SIDS, but will not respond. This emulates a global communications failure |
| COS Interval | Specify the COS Interval for all SIDs |
| Invalid Msg's | Toggle the Invalid Messages Indicator for all SIDs to send corrupt message data |
| Alarm Modules | Increase or decrease the number of alarm modules on each SID by counts of 10 ("<<" or ">>") or 1 ("<" or ">") |
| Alarm Points | Increase or decrease the number of alarm points on each SID by counts of 10 ("<<" or ">>") or 1 ("<" or ">") |

Individual Station Configuration

In step 506, the user is provided the capability to configure any individual state monitoring device or Station (SID) on a control link. By selecting a certain DL 10 SID (indicated by each column in the row marked " . . . + . . . 1 . . . ") from the configuration screen 700, a corresponding individual station configuration display 1000 having individual station parameters is presented as shown in FIG. 10. This display window 1000 is shown separately in FIG. 10 for clarity; however, it can be overlaid on the configuration file display 700 as is common in GUI display applications.

The individual station display window 1000 includes a top row identifying the physical port number and whether the port is enabled or disabled, e.g., Physical Port 1 is ON. The user can perform the individual station configuration functions in step 506 by varying the individual station parameters in display 1000 as shown and described in the following Table 3:

| Individual station parameter | Function |
| --- | --- |
| Physical Port X On/Off | Indicates whether the entire port X, e.g., port 1 to 16, is enabled (Y) or diabled (N) |
| Station ID X On/Off | Enable or disable SID X, e.g. SID 10. If disabled, the Emulator will still receive MCS |

-continued

| Individual station parameter | Function |
| --- | --- |
| | messages for SID X, but will not be able to respond. This emulates a single state monitoring device failure |
| COS Interval | Specify the COS Interval for SID X |
| Invalid Msg's | Toggle the Invalid Messages Indicator for SID X to send corrupt message data |
| Alarm Modules | Increase or decrease the number of alarm modules on SID X by counts of 10 ("<<" or ">>") or 1 ("<" or ">") |
| Alarm Points | Increase or decrease the number of alarm points on SID X by counts of 10 ("<<" or ">>") or 1 ("<" or ">") |

In addition to the individual station parameters, the following statistical station data regarding specific activity at a station SID during the emulator operation is displayed in window 1000, as shown and described in Table 4 below:

| Name of Data | Station (SID) Activity |
| --- | --- |
| Normal Polls | The number of automated polling messages received from the MCS |
| MI Polls | The number of manual interrogatories received from the MCS |
| Short Responses | The number of short responses sent to the MCS |
| Long Responses | The number of long responses sent to the MCS |
| Invalid Responses | The number of invalid messages sent to the MCS |

In another feature of the present invention, configuration changes made in steps 504, 506, and 508 may be saved under a different configuration filename by pressing button 797, thereby permitting the user to load a particular configuration at any time. This allows the user to run test scenarios and perform assessments on certain network designs.

Real-Time Message Display

In step 510, the user may view real-time decoded input/output messages that are being sent and received by the Emulator. Due to the nature of the DL 10 device, the raw messages are in binary format, this feature provides a user-friendly view to quickly determine the outcome of polled and response messages. FIG. 11 shows the real-time message window 1100 available to the user that identifies actual MCS polling commands and emulator response messages. Poll messages are identified with a "P" in the first column and response messages are identified with an "R". Message ID is a sequential numbering of each message sent and received by the Emulator which aids performance monitoring of the Emulator 200 and/or MCS 104, error tracing, de-bugging, and record keeping. Other data is displayed under appropriate column headings (Len, Sta, MI, COS, Diag) which identifies the length of the message in bytes (Len), identifies the SID station that sent or received the message (Sta), indicates whether a poll message was sent as a Manual Interrogatory (MI), indicates when a COS was detected and included with the message (COS), and a diagnostics code for troubleshooting (Diag).

Network Event Selection and Execution

In step 512, different network events can be emulated to further stress the MCS 104 under test. These network events can represent changes in the status of different physical elements being monitored, i.e., different alarm points. Global changes to COS report network 100 can also be emulated.

Figure 12:
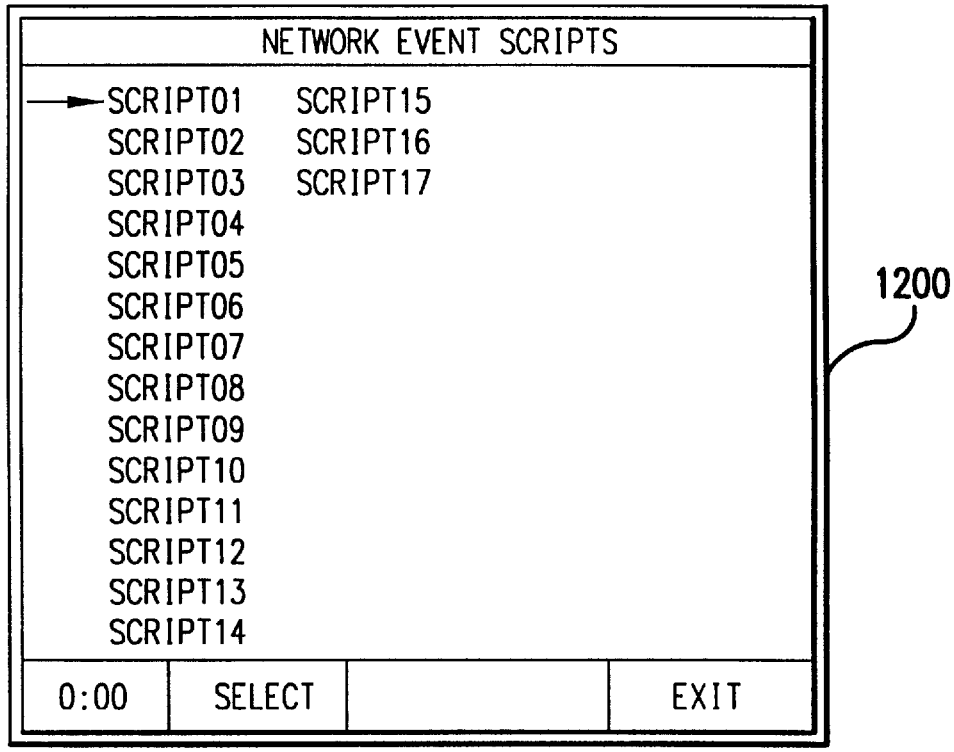
FIG. 12 is a screen display which lists available network event scripts.

First, a Network Event Script Display 1200 is presented to the user as shown in FIG. 12. This display can be selected through a pull-down menu by pressing a script button 796 as shown in display 700 listing different emulator 200 control options. A series of script names, referring to the files which contain them, is presented. The user simply selects one for execution. The selected script identifies specific configuration changes to be made to the configuration data file 215.

Such configuration changes are made to reflect a hypothetical network event. For example, if the application of the present invention is for DL 10 devices monitoring state changes of transmission equipment in a telecommunications network, then a transmission outage will trigger a series of COS detections within certain DL 10 devices. The user can build a script that specifies such detections and where they occur, based on predetermined network topology. The script file is written as a data file. The Emulator will interpret and execute the script and make appropriate toggles in parameters and COS indicators in the configuration data, thus emulating the desired network event. This is useful in testing the MCS software's performance in response to a wide range of hypothetical events.

Figure 13:
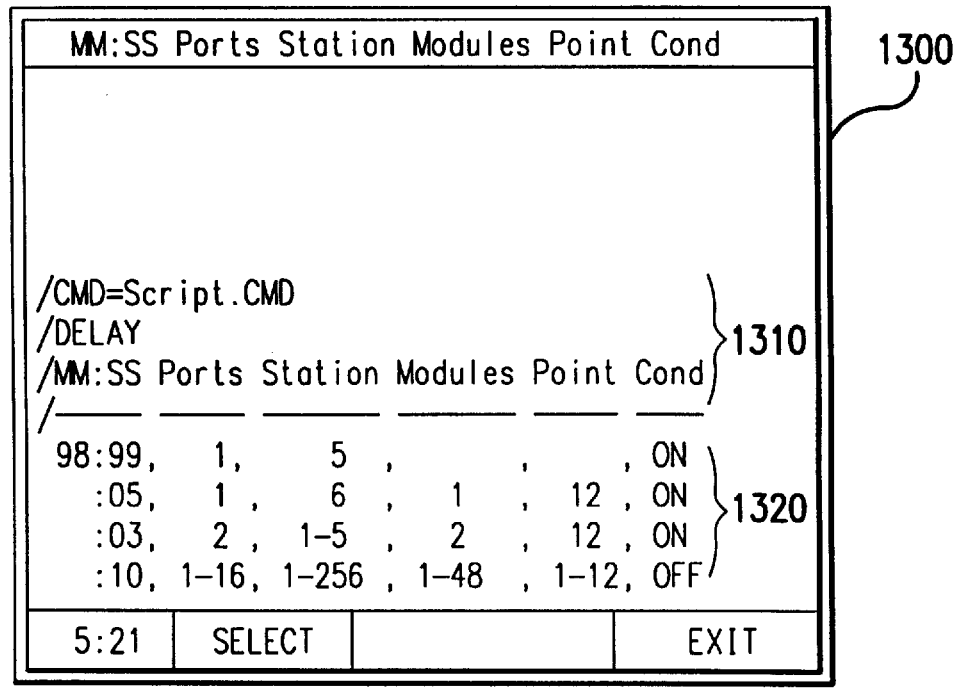
FIG. 13 is a screen display showing execution of a network event script selected from the listing in FIG. 12.

FIG. 13 illustrates an example of a script display 1300 showing a script covering hypothetical network events down to an alarm point level. The rows under the header 1310 contain columns of status information 1320 for certain alarm points. The first column, marked "MM:SS", indicates the minutes and seconds of delay prior to executing each alarm point change. This emulates the delays of alarm status changes in an actual network of state monitoring devices. The second column, marked "Ports", identifies the physical port (control link) of the state monitoring device to be changed. This may be an individual Port ("1"), or a range of Ports ("1–16").

The third column, marked "Station", identifies the SID. The fourth column, marked "Modules", identifies one or more latched Change-of-State (COS) alarm modules within a SID (i.e., 1 of 48 alarm modules within a DL 10 SID). The fifth column, marked "Point", identifies the individual alarm points with the alarm module(s). The last column, marked "Cond" (Condition), indicates whether the alarm point is to be turned ON or OFF in the hypothetical event represented by the script.

When the script is executed in step 512, the Emulator 200 will modify the Configuration Data file 215 to reflect the alarm point conditions specified in the script (FIG. 13). These modifications will be temporal, according to the delays indicated in the script.

As stated previously, the user interface tasks represented in FIG. 3 as step 312 and detailed in FIG. 5 are performed simultaneous to the Intelligent Commands and Responses tasks of step 310. This is done via the simulated multitasking routine of the previously described co-pending patent application having Ser. No. 08/641,460 In this way, configuration changes made by the user, either manually or via script, have a direct and immediate impact on the Emulator's processing of responses to the MCS 104.

Statistical Report Display

If the user opts to terminate processing in step 314, then in step 315 the Emulator creates a statistical report 214 from a statistical log file (not shown). The statistics log records statistical data collected during Emulator operation. These statistical data is kept for all communications ports and devices that detected activity during execution. An interim statistical report 214 can also be displayed at the request of the user. An example of such a report 1400 is illustrated in FIG. 14.

During or after termination of Emulator operation, the user may also view the Communications Log 211 or the Self-Diagnostics Log 212.

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. An emulator apparatus for emulating a report network of state monitoring devices to allow testing of a monitor and control system (MCS), the emulator apparatus comprising:

a communication module which communicates with the MCS over at least one emulator link using a communications protocol substantially identical to a communications protocol used in the report network to communicate to the MCS;

a memory unit for storing configuration data representative of the behavior of the report network, wherein said configuration data identifies the current status of the report network including the status of each emulated state monitoring device and control link; and a processor coupled to said communication module and said memory unit, said processor sending emulator messages from said communication module to the MCS over said at least one emulator link, said emulator messages being generated based on said configuration data to emulate messages sent from the report network to the MCS.

2. The emulator apparatus of claim 1, wherein the report network comprises a change-of-state (COS) reporting network covering a plurality of state monitoring devices; wherein each state monitoring device covers a plurality of alarm modules and each alarm module covers a plurality of alarm points, each alarm point representing a change-of-state monitor for a physical element.

3. The emulator apparatus for claim 2, wherein the COS report network being emulated covers over two million alarm points.

4. The emulator apparatus of claim 1, wherein said status of each control link identifies whether the control link is enabled or disabled and wherein said status of each state monitoring device identifies whether each state monitoring device is enabled or disabled.

5. The emulator apparatus of claim 4, wherein said status of each state monitoring device further identifies for each state monitoring device a station identifier and a COS polling interval, and whether corrupt data is to be output.

6. The emulator apparatus of claim 2, wherein said processor further comprises:

a control link servicer which detects incoming MCS messages sent to the emulator apparatus by the MCS;

a user-interface servicer which detects user inputs received through a user-interface, said processor updates said configuration data to emulate selected network events identified by user-inputs; and an emulator message generator, wherein said emulator message generator generates emulator messages in response to said incoming MCS messages detected by said control-link servicer based on said configuration data, said emulator messages matching messages which would be sent from state monitoring devices in the emulated monitoring network in response to the detected incoming MCS messages.

7. The emulator apparatus of claim 6, wherein said processor further determines whether said generated emulator messages correspond to state monitoring devices and control links which are enabled and transmitting based on said configuration data.

8. The emulator apparatus of claim 7, wherein said processor switches control transparently between said control-link servicer and said user-interface servicer to service said at least one emulator control link and user-inputs in a pseudo-parallel sequence simulating multi-tasking.

9. The emulator apparatus of claim 8, wherein:

said user-link servicer comprises a first program module for executing a first task to service said user-interface, said first program module having a control switch call after each partial logic unit of work in said first task;

said control link servicer comprises a second program module for executing a second task to service incoming MCS messages received over said at least one emulator control link; and said processor further comprises a simulated multi-task controller for transparently switching control between said user-link servicer and said control link servicer;

wherein said simulated multi-tasking controller switches control from said user-link servicer to said control link servicer when said control switch call is read during execution of said first program module and an incoming MCS message is detected, and switches control from said control link-servicer back to said user-interface servicer to resume said first task after a partial logical unit of work in the second task has been executed by said control link servicer.

10. The emulator apparatus of claim 1, wherein said processor provides sub-second responses to the MCS and a user-interface.

11. The emulator apparatus of claim 1, wherein the emulator apparatus is run on a stand-alone personal computer connected to the MCS.

12. The emulator apparatus of claim 1, wherein user-inputs are entered through a user-interface for controlling the emulator apparatus.

13. The emulator apparatus of claim 3, wherein said incoming MCS messages comprise MCS polling commands.

14. The emulator apparatus of claim 1, wherein the report network being emulated monitors transmission equipment in a telecommunication network.

15. The emulator apparatus of claim 1, wherein said processor operates in a demo mode without connectivity to the MCS.

16. An emulator apparatus for emulating a report network of state monitoring devices to allow testing of a monitor and control system (MCS), the emulator apparatus comprising:

a communication module which communicates with the MCS over at least one emulator link using a communications protocol substantially identical to a communications protocol used in the report network to communicate, to the MCS;

a memory unit for storing configuration data representative of the behavior of the report network; and a processor coupled to said communication module and said memory unit, said processor sending emulator messages from said communication module to the MCS over said at least one emulator link, said emulator messages being generated based on said configuration data to emulate messages sent from the report network to the MCS, wherein said configuration data identifies the current status of the report network including the status of each provisioned alarm point in each emulated state monitoring device.

17. An emulator apparatus for emulating a report network of state monitoring device to allow testing of a monitor and control system (MCS), the emulator apparatus comprising:

a communication module which communicates with the MCS over at least one emulator link using a communications protocol substantially identical to a communications protocol used in the report network to communicate to the MCS;

a memory unit for storing configuration data representative of the behavior of the report network; and a processor coupled to said communication module and said memory unit, said processor sending emulator messages from said communication module to the MCS over said at least one-emulator link, said emulator messages being generated based on said configuration data to emulate messages sent from the report network to the MCS, wherein each of said at least one emulator link emulates a respective multi-drop circuit having a respective group of said state monitoring devices connected in parallel to said corresponding at least one emulator link.

18. An emulator apparatus for emulating a report network of state monitoring devices to allow testing of a monitor and control system (MCS), the emulator apparatus comprising:

a communication module which communicates with the MCS over at least one emulator link using a communications protocol substantially identical to a communications protocol used in the report network to communicate to the MCS;

a memory unit for storing configuration data representative of the behavior of the report network; and a processor coupled to said communication module and said memory unit, said processor sending emulator messages from said communication module to the MCS over said at least one emulator link, said emulator messages being generated based on said configuration data to emulate messages sent from the report network to the MCS, wherein user-inputs are entered through a user-interface for controlling the emulator apparatus and wherein said user inputs include user-inputs identifying changes to said configuration data, and said processor updates said configuration data in accordance with said user-inputs.

19. An emulator apparatus for emulating a report network of state monitoring devices to allow testing of a monitor and control system (MCS), the emulator apparatus comprising:

a communication module which communicates with the MCS over at least one emulator link using a communications protocol substantially identical to a communications protocol used in the report network to communicate to the MCS;

a memory unit for storing configuration data representative of the behavior of the report network; and a processor coupled to said communication module and said memory unit, said processor sending emulator messages from said communication module to the MCS over said at least one emulator link, said emulator messages being generated based on said configuration data to emulate messages sent from the report network to the MCS, wherein said processor detects user inputs identifying a selected network event and builds a network event script file representative thereof.

20. The emulator apparatus of claim 19, wherein said selected network event represents a transmission outage producing a plurality of change-of-state detections for physical elements in the report network being emulated.

21. An emulator apparatus for emulating a report network of state monitoring devices to allow testing of a monitor and control system (MCS), the emulator apparatus comprising:

a communication module which communicates with the MCS over at least one emulator link using a communications protocol substantially identical to a communications protocol used in the report network to communicate to the MCS;

a memory unit for storing configuration data representative of the behavior of the report network; and a processor coupled to said communication module and said memory unit, said processor sending emulator messages from said communication module to the MCS over said at least one emulator link, said emulator messages being generated based on sad configuration data to emulate messages sent from the report network to the MCS, wherein said processor executes a user-selected network event script file corresponding to a selected network event, and updates said configuration data to emulate said selected network event.

22. An emulator apparatus for emulating a report network of state monitoring devices to allow testing of a monitor and control system (MCS), the emulator apparatus comprising:

a communication module which communicates with the MCS over at least one emulator link using a communications protocol substantially identical to a communications protocol used in the report network to communicate to the MCS;

memory unit for storing configuration data representative of the behavior of the report network; and a processor coupled to said communication module and said memory unit, said processor sending emulator messages from said communication module to the MCS over said at least one emulator link, said emulator messages being generated based on said configuration data to emulate messages sent from the report network to the MCS, further comprising a user-interface module for providing emulator control displays at the user-interface including a global station and link configuration display and an individual station configuration display.

23. A emulator apparatus for emulating a report network of state monitoring devices to allow testing of a monitor and control system (MCS), the emulator apparatus comprising:

a communication module which communicates with the MCS over at least one emulator link using a communications protocol substantially identical to a communications protocol used in the report network to communicate to the MCS;

a memory unit for storing configuration data representative of the behavior of the report network; and a processor coupled to said communication module and said memory unit said processor sending emulator messages from said communication module to the MCS over said at least one emulator link, said emulator messages being generated based on said configuration data to emulate messages sent from the report network to the MCS, wherein said processor maintains a communication log file which includes all incoming MCS commands sent to the emulator apparatus and all outgoing emulator messages sent from the emulator apparatus to the MCS.

24. An emulator apparatus for emulating a report network of state monitoring devices to allow testing of a monitor and control system (MCS), the emulator apparatus comprising:

a communication module which communicates with the MCS over at least one emulator link using a communications protocol substantially identical to a communications protocol used in the report network to communicate to the MCS;

a memory unit for storing configuration data representative of the behavior of the report network; and a processor coupled to said communication module and said memory unit, said processor sending emulator messages from said communication module to the MCS over said at least one emulator link, said emulator messages being generated based on said configuration data to emulate messages sent from the report network to the MCS, wherein said emulator messages sent to the MCS include short responses for reporting no change of state and long responses for reporting a change of state in alarm points of a state monitoring device.

25. An emulator apparatus for emulating a report network of state monitoring devices to allow testing of a monitor and control system (MCS), the emulator apparatus comprising:

a communication module which communicates with the MCS over at least one emulator link using a communications protocol substantially identical to a communications protocol used in the report network to communicate to the MCS;

a memory unit for storing configuration data representative of the behavior of the report network; and a processor coupled to said communication module and said memory unit, said processor sending emulator messages from said communication module to the MCS over said at least one emulator link, said emulator messages being generated based on said configuration data to emulate messages sent from the report network to the MCS, wherein said processor maintains a self-diagnostics log file which includes error messages generated by said processor during operation of the emulator apparatus.

26. An emulator apparatus for emulating a report network of state monitoring devices to allow testing of a monitor and control system (MCS), the emulator apparatus comprising:

a communication module which communicates with the MCS over at least one emulator link using a communications protocol substantially identical to a communications protocol used in the report network to communicate to the MCS;

a memory unit for storing configuration data representative of the behavior of the report network; and a processor coupled to said communication module and said memory unit, said processor sending emulator messages from said communication module to the MCS over said at least one emulator link, said emulator message being generated based on said configuration data to emulate messages sent from the report network to the MCS, wherein said communication protocol used in said communication module further mimics an electrical signal interface protocol used by the report network.

27. A computer-implemented method for emulating a report network of state monitoring devices to test a monitor and control system (MCS), comprising the steps of:

storing configuration data representative of the behavior of the report network being emulated, wherein said configuration data identifies the current status of the report network including the status of each emulated state monitoring device and control link;

establishing connectivity with the MCS over at least one emulator link;

detecting incoming MCS messages; and sending emulator messages over said at least one emulator link to the MCS in response to said incoming MCS messages based on said configuration data, said emulator messages emulating messages sent from state monitoring devices in the emulated report network to the MCS in response to said detected incoming MCS messages.

28. The method of claim 27, wherein said storing step includes the step of automatically provisioning alarm modules and alarm points.

29. A computer-implemented method for emulating a report network of state monitoring device to test a monitor and control system (MCS), comprising the step of:

storing configuration data representative of the behavior of the report network being emulated;

establishing connectivity with the MCS over at least one emulator link;

detecting incoming MCS messages; and sending emulator messages over said at least one emulator link to the MCS in response to said incoming MCS messages based on said configuration data, said emulator messages emulating messages sent from state monitoring devices in the emulated report network to the MCS in response to said detected incoming MCS messages, further comprising the steps of:

detecting user inputs identifying a modification in said configuration data; and updating said configuration data to represent said modification.

30. The method of claim 29, wherein said updating step comprises setting global station and link parameters including at least one of the following global parameters covering each link and corresponding state monitoring devices: a physical port On/Off indicator, a Station ID On/Off indicator, a COS interval, Invalid Messages indicator, a number of provisioned alarm modules in each state monitoring device, and a number of provisioned alarm points in each provisioned alarm module.

31. A computer-implemented method for emulating a report network of state monitoring devices to test a monitor and control system (MCS), comprising the steps of:

storing configuration data representative of the behavior of the report network being emulated;

establishing connectivity with the MCS over at least one emulator link;

detecting incoming MCS messages; and sending emulator messages over said at least one emulator link to the MCS in response to said incoming MCS messages based on said configuration data, said emulator messages emulating messages sent from state monitoring devices in the emulated report network to the MCS in response to said detected incoming MCS messages, further comprising the steps of:

executing a user-selected network event script file corresponding to a selected network event; and updating said configuration data to emulate said selected network event.

32. A computer-implemented method for emulating a report network of state monitoring devices to test a monitor and control system (MCS), comprising the steps of:

storing configuration data representative of the behavior of the report network being emulated;

establishing connectivity with the MCS over at least one emulator link;

detecting incoming MCS messages; and sending emulator messages over said at least one emulator link to the MCS in response to said incoming MCS messages based on said configuration data, said emulator messages emulating messages sent from state monitoring devices in the emulated report network to the MCS in response to said detected incoming MCS messages, further comprising the step of displaying at least one emulator control display at the user-interface selected from the following group of emulator control displays: a global station and link configuration display, an individual station configuration display, a manual setting of alarm points display, a real-time decoded input /output display, and a network event script listing.

* * * * *